US008833693B2

(12) United States Patent
Lafitte et al.

(10) Patent No.: US 8,833,693 B2
(45) Date of Patent: Sep. 16, 2014

(54) SELECTIVE FORCE TRANSMISSION DEVICE AND AN UNDERCARRIAGE CONSISTING OF AN APPLICATION THEREOF

(75) Inventors: Arnaud Lafitte, Chaville (FR); Gérard Balducci, Saint Germain de la Grange (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 42 days.

(21) Appl. No.: 13/262,900

(22) PCT Filed: Apr. 6, 2010

(86) PCT No.: PCT/EP2010/054536
§ 371 (c)(1),
(2), (4) Date: Dec. 20, 2011

(87) PCT Pub. No.: WO2010/115893
PCT Pub. Date: Oct. 14, 2010

(65) Prior Publication Data
US 2012/0091264 A1    Apr. 19, 2012

(30) Foreign Application Priority Data
Apr. 6, 2009    (FR) ...................................... 09 01684

(51) Int. Cl.
*B64C 25/50*    (2006.01)
*F16D 7/10*    (2006.01)

(52) U.S. Cl.
CPC .. *B64C 25/50* (2013.01); *F16D 7/10* (2013.01)
USPC ........................ 244/50; 244/100 R; 244/99.9

(58) Field of Classification Search
USPC ....................................... 244/50, 100 R, 99.9
See application file for complete search history.

(56) References Cited

U.S. PATENT DOCUMENTS

| 2,508,057 | A | * | 5/1950 | Bishop ............................. 244/50 |
| 2,974,503 | A |   | 3/1961 | Newton |
| 3,565,455 | A | * | 2/1971 | Kostas .................... 280/124.127 |
| 4,067,425 | A |   | 1/1978 | Soter |
| 4,155,522 | A | * | 5/1979 | Sealey ........................ 244/102 R |
| 4,881,612 | A | * | 11/1989 | Yano et al. ..................... 180/405 |
| 5,100,083 | A | * | 3/1992 | Large et al. .............. 244/102 SS |
| 6,016,995 | A | * | 1/2000 | Squires et al. ............. 244/102 R |
| 6,273,364 | B1 | * | 8/2001 | Tizac et al. ............... 244/100 R |
| 6,279,853 | B1 | * | 8/2001 | Brighton .................. 244/102 SL |

(Continued)

FOREIGN PATENT DOCUMENTS

| EP | 1 845 016 A1 | 10/2007 |
| FR | 2 905 997 A1 | 3/2008 |
| GB | 2 321 504 A | 7/1998 |
| JP | 11063060 | * 3/1999 ................ F16F 7/08 |

*Primary Examiner* — Isam Alsomiri
*Assistant Examiner* — Assres H Woldemaryam
(74) *Attorney, Agent, or Firm* — Sughrue Mion, PLLC

(57) ABSTRACT

The invention relates to a device for selectively transmitting force, the device comprising a first element and a second element that is movably mounted on the first element, a friction member being arranged between the first element and the second element to exert a friction force between them, which force presents a maximum value that depends on prestress imparted by a presser member. The device includes control means for varying the prestress imparted by the presser member to the friction member and arranged, where appropriate, to substantially release the prestress imparted by the presser member so that the prestress becomes substantially zero.

4 Claims, 2 Drawing Sheets

(56) References Cited

U.S. PATENT DOCUMENTS

| | | | |
|---|---|---|---|
| 6,945,496 B2* | 9/2005 | Reniau | 244/100 R |
| 7,281,723 B2* | 10/2007 | Prohaska | 280/124.127 |
| 7,284,764 B2* | 10/2007 | Prohaska | 280/124.127 |
| 7,575,193 B2* | 8/2009 | Payen et al. | 244/100 R |
| 7,677,117 B2* | 3/2010 | Perriard et al. | 73/862.626 |
| 7,854,411 B2* | 12/2010 | Bucheton et al. | 244/103 R |
| 8,220,598 B2* | 7/2012 | Valembois | 188/129 |
| 2007/0057117 A1* | 3/2007 | Payen et al. | 244/100 R |
| 2007/0095976 A1* | 5/2007 | Bietenhader | 244/102 A |
| 2007/0228825 A1* | 10/2007 | Perriard et al. | 303/191 |
| 2007/0241230 A1* | 10/2007 | Bucheton et al. | 244/104 R |
| 2008/0237396 A1* | 10/2008 | Bietenhader | 244/102 A |
| 2010/0052232 A1* | 3/2010 | Valembois | 267/205 |

\* cited by examiner

SELECTIVE FORCE TRANSMISSION DEVICE AND AN UNDERCARRIAGE CONSISTING OF AN APPLICATION THEREOF

CROSS REFERENCE TO RELATED APPLICATION

This application is a National Stage of International Application No. PCT/EP2010/054536 filed Apr. 6, 2010, claiming priority based on French Patent Application No. 09 01684, filed Apr. 6, 2009, the contents of all of which are incorporated herein by reference in their entirety.

The invention relates to an undercarriage having a steerable bottom portion fitted with a selective force transmission device.

TECHNOLOGICAL BACKGROUND OF THE INVENTION

Document FR 2 905 997 discloses force transmission devices each comprising a first element and a second element that is movably mounted on the first element but that is held stationary thereon until the force imparted by the first element exceeds a given threshold. Beyond the threshold, the second element is released and can move relative to the first element against an opposing force that is equal to said threshold.

The term "force" is naturally used to cover both a force proper and a torque if the two elements are mounted to turn relative to each other.

Specifically, in the devices disclosed in the above-mentioned document, the opposing force is exerted by a friction member arranged between the two elements in order to exert an opposing force between them having a maximum value that depends on a level of prestress exerted by a presser member.

The present invention relates particularly to the application of such devices to an undercarriage that includes a steerable bottom portion that can be steered by means of steering actuators. In particular with an undercarriage having a steerable bottom portion that is actuated by electromechanical actuators, it is advantageous to be able to disengage the actuators from the steerable bottom portion, or to protect the actuators against a return torque.

Document FR 2 899 871 proposes fitting each actuator with a clutch device. One immediate option would be to arrange the above-mentioned force transmission device to take the place of each of the clutch devices.

OBJECT OF THE INVENTION

The invention seeks to propose another way of incorporating the device in an undercarriage.

Under certain circumstances, and in particular while an aircraft is being towed by a tractor that is coupled to the steerable bottom portion of the undercarriage, it is advantageous to be able to decouple the actuators of the steerable bottom portion. Nevertheless, if such decoupling is omitted, the motor and the gearing of each of the actuators is subjected to torque that is imparted by the steerable bottom portion of the undercarriage being turned under the action of the tractor. It is then desirable to protect the motors of the electromechanical steering actuators and the associated gearing so as to avoid excessive torque damaging the actuators.

Conversely, it can happen that the steering actuators are controlled in untimely manner when the undercarriage wheels are prevented from turning, either by chucks, or else by a tow bar coupled to the bottom portion of the undercarriage.

It is then advantageous to fit such an undercarriage with a device that enables the actuators to be decoupled, or failing that that enables torque to be transmitted only up to a given threshold, so as to avoid damaging the undercarriage.

BRIEF DESCRIPTION OF THE INVENTION

In order to achieve this object, the invention provides an aircraft undercarriage including a strut that carries a steerable bottom portion carrying one or more wheels, and at least one steering actuator carried by the strut to steer the steerable bottom portion in selective manner, the undercarriage including a selective force transmission device that comprises a first element and a second element that is mounted to move relative to the first element, a friction member being arranged between the first element and the second element to exert a friction force between the two elements, which force presents a maximum value that depends on prestress established by a presser member, the device including control means for varying the prestress imparted by the presser member to the friction member, which control means are arranged to be capable of substantially releasing the prestress imparted by the presser member so that the prestress becomes substantially zero, the device being arranged on the undercarriage in such a manner that the first element of the transmission device is constrained in turning with the steerable bottom portion, and the second element of the transmission device is constrained in turning with a portion of the undercarriage that is actuated by the steering actuator.

Thus, by varying the prestress exerted by the presser member in controlled manner, it is possible not only to adjust the opposing force from the device, and thus the threshold level of force that can be transmitted, but it is also possible, by eliminating the prestress, to release the two elements completely. Thus, the device becomes a coupling device of adjustable threshold force, but is also capable of providing decoupling under control.

Thus, the threshold varying means of the device make it possible at will to release the steerable bottom portion of the undercarriage, thereby enabling the steerable bottom portion to be steered freely, e.g. under the effect of the traction exerted by a towing tractor, and it is also possible, likewise at will, to modulate the maximum level of force that can be transmitted between the toothed rim and the steerable bottom portion. Thus, should one of the actuators fail, for example, it is possible to reduce the threshold level of torque that can be transmitted in order to avoid damaging the remaining working actuator.

The force transmission device arranged in this way is capable of co-operating with a plurality of steering actuators.

BRIEF DESCRIPTION OF THE FIGURES

The invention can be better understood in the light of the following description of the figures of the accompanying drawings, in which.

DETAILED DESCRIPTION OF THE FIGURES

Figure 1:
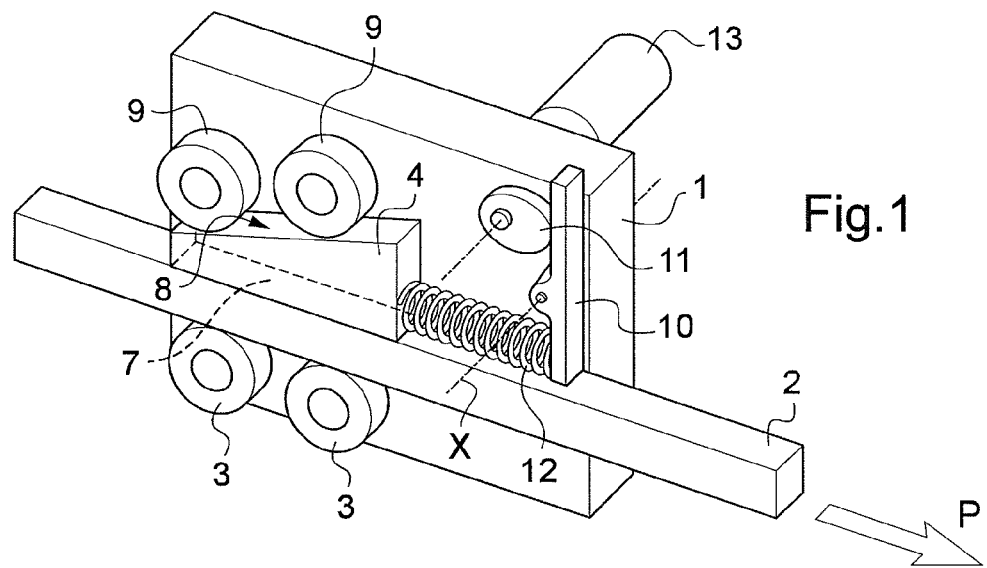
FIG. 1 is a diagrammatic perspective view of a device in a first particular embodiment of the invention.

FIG. 1 shows an improvement according to the invention of the device shown in FIG. 1 of document FR 2 905 997.

The first element 1 can be seen having the second element 2 mounted thereon to slide in the direction indicated by arrow P. For this purpose, wheels 3 mounted to rotate on the first element 1 guide the second element 2. A friction member, specifically a wedge 4, has firstly a friction surface 7 that rubs against the second element 2 and secondly a bearing surface 8 that lies at an angle relative to the friction surface, the friction member being located between the second element 2 and bearing wheels 9 rotatably mounted on the first element 1. The wedge 4 is urged towards a wedging position by a presser member, specifically a spring 12 extending between the wedge 4 and the end of a lever 10 that is mounted on the first element 1 to pivot about an axis X. The other end of the lever 10 engages an eccentric cam 11 carried at the end of the shaft of an electric motor 13.

By using the motor 13 to turn the cam 11, it is thus possible to vary the prestress exerted by the spring 12 on the wedge 4 from a maximum value (position shown in the figure) to a zero value (when the cam 11 has turned through 180°). In this position, the spring 12 is then completely relaxed.

Thus, so long as the force pulling on the second element 2 does not exceed a threshold force set by the force exerted by the spring, the second element 2 remains stationary and cannot be moved relative to the first element 1. If the traction force exceeds this threshold force, then the second element 2 moves against an opposing force that is equal to the above-mentioned maximum force.

By means of the provisions of the invention, it is possible at will to vary the opposing force exerted by the wedge on the second element 2 during its movement relative to the first element 1, and indeed to eliminate said force, if necessary.

Figure 2:
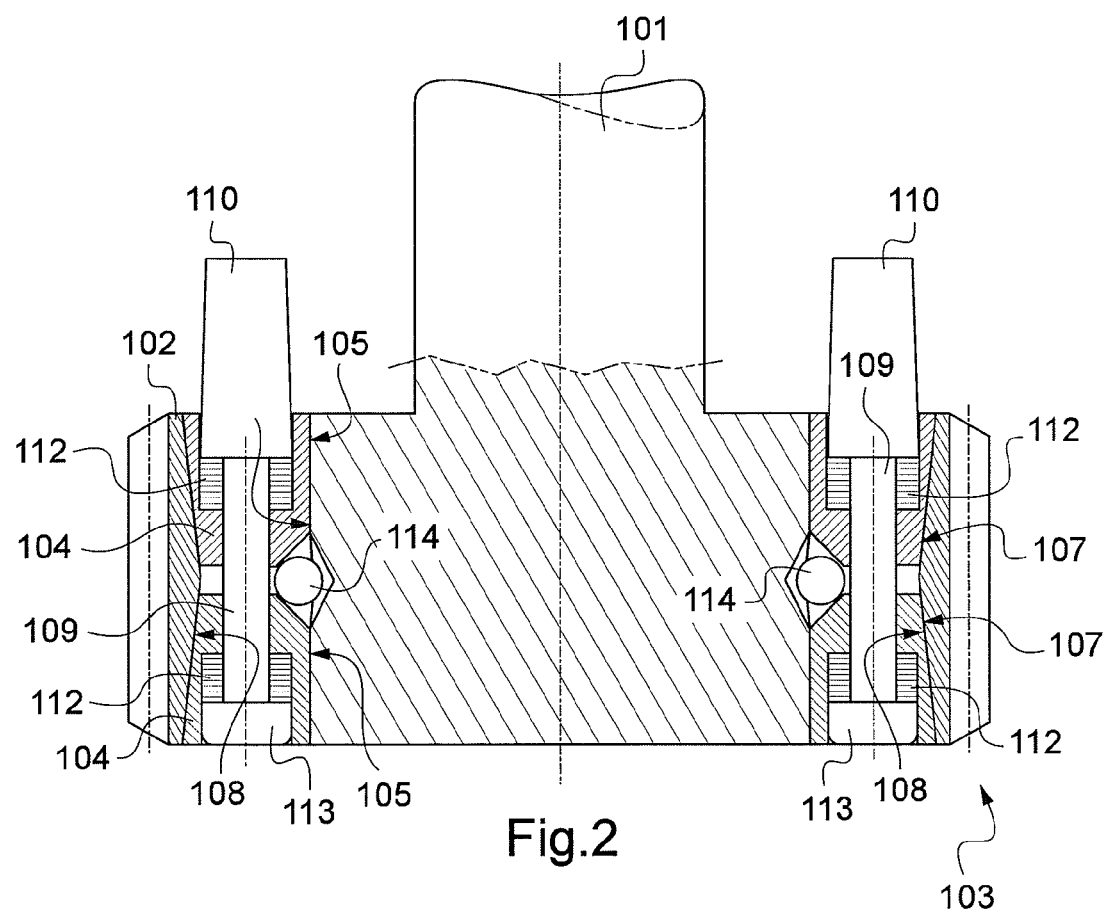
FIG. 2 is a diagrammatic section view of a device in a second particular embodiment of the invention.
Figure 4:
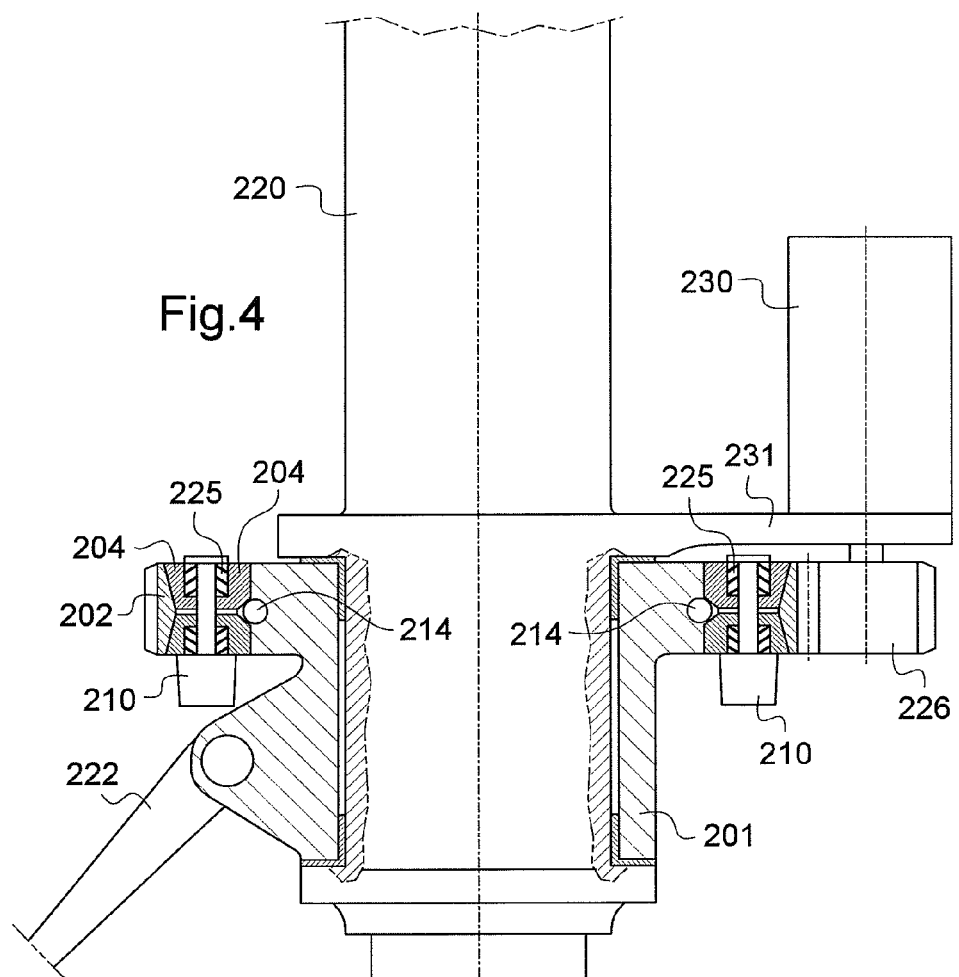
FIG. 4 is a section view of an aircraft undercarriage fitted with the device shown in FIGS. 2 and 3.
Figure 3:
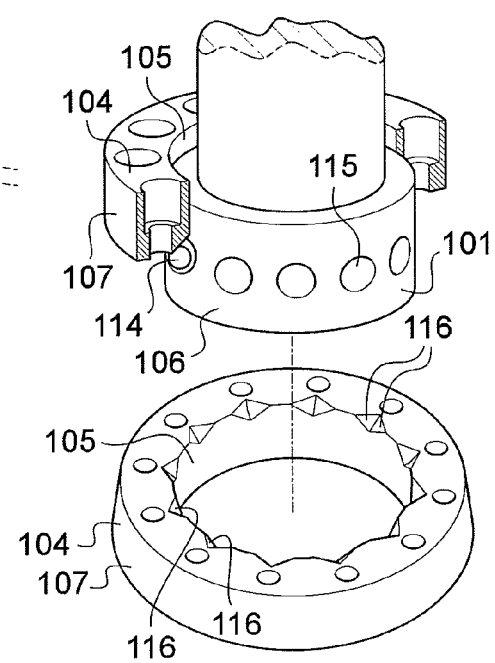
FIG. 3 is an exploded fragmentary perspective view of the FIG. 2 device.

The device shown in FIGS. 2 and 3 of the present document relates to an improvement of the device shown in FIGS. 2, 3, and 4 of document FR 2 905 997. For details about the operation of the device, reference may usefully be made to the above-mentioned document. It suffices here to recall that the device comprises a first element, here a shaft 101, and a second element, here a toothed rim 102 that extends coaxially about the shaft 101. Between the two elements there is arranged a transmitter device 103 that comprises a friction member in the form of two rings 104 mounted in a mirror configuration, each having a circularly cylindrical inner bearing surface 105 that bears against a circularly cylindrical bearing surface 106 of the shaft 101, and a gently sloping frustoconical outer bearing surface 107 that co-operate with a complementary frustoconical bearing surface 108 of the toothed rim 102. It can be seen that as a result of the mirror configuration of the rings 104, the bearing surface 108 of the toothed rim 102 that co-operates with the rings 104 presents a biconical shape.

The rings 104 are pierced by through axial orifices, each having a moving rod 109 of a prestress actuator 110 engaged therein. The axial orifices include shoulders that define bearing faces receiving spring washers 112 that, by bearing both against the body of the prestress actuator 110 and against an end stub 113 of the moving rod 109, exert prestress on the rings 104 tending to press the bearing surfaces of the rings 104 against the shaft 101 and also against the toothed rim 102.

In order to prevent rotary and axial movement of the rings 104 relative to the shaft 101, and as can be seen more particularly in FIG. 3, balls 114 (only one ball being shown) are arranged so as to be wedged firstly in cavities 115 in the form of spherical caps that are formed in the shaft 101, and secondly in faceted half-cavities 116 formed in each of the rings 104. When the rings 104 are fitted onto the shaft 101 and are held pressed together by the spring washers 112, then each of the balls 114 is held captive in a cavity that is formed by a cavity 115 in the form of a spherical cap and two faceted half-cavities 116 facing each other and belonging to respective ones of the rings 104. The balls 114 thus constitute an obstacle serving to prevent the rings 104 from moving axially and in rotation relative to the shaft 101. The assembly operates as follows. Using the prestress actuators 110, determined prestress is applied to the rings 104. Because of the obstacle formed by the balls 114, the rings 104 are constrained to turn regardless of the torque imposed by the shaft 101. The toque is transmitted to the toothed rim 102 by friction between the conical bearing surfaces of the rings 104 and of the toothed rim 102. If the torque exceeds a maximum value that is determined by the value of the applied prestress, then the toothed rim slides relative to the rings 104.

Thus, the coupling between the toothed rim 102 and the shaft 101 performs torque limiting. Naturally, this torque limiting applies equally well for torque being imparted by the toothed rim 102 to the shaft 101, and for a torque being imparted by the shaft 101 to the toothed rim 102.

If it is desired to uncouple the shaft 101 from the toothed rim 102, then it suffices to operate the prestress actuators 110 so that they completely release the prestress imparted by the spring washers 112 to the rings 104. The toothed rim 102 is then released relative to the shaft 101 and is free to turn (ignoring residual friction) relative to the shaft 101.

In this example, the prestress actuators 110 are advantageously of the piezoelectric type. However, any other technology (hydraulic, electromechanical, . . . ) could be envisaged in the context of the invention.

This principle is now applied to controlling the steering of undercarriages, as shown in FIG. 4. In this figure, there can be seen the strut 220 of the undercarriage on which a turnable sleeve 201 is swivel-mounted. In conventional manner, the turnable sleeve 201 is connected by a torque links 222 (its branches being shown in part) to a sliding rod 223 that carries the wheels at its bottom end (not shown herein). The torque links 222 allow the slidable rod 223 to slide freely in the strut 220 while allowing the sliding rod 223 to turn and thus allowing the wheels carried thereby to be steered by turning the turnable sleeve 201.

For this purpose, the turnable sleeve 201 is fitted with a toothed rim 202 that is here connected to the turnable sleeve 201 by controllable coupling means entirely similar to those described with reference to FIGS. 2 and 3. There can be seen the rings 204, the spring washers 212, the balls 214, and the prestress actuators 210.

The toothed rim 202 is engaged by a gearwheel 226 of an electromechanical steering actuator 230 fastened to a plate 231 that is secured to the strut 220. The electromechanical actuator includes at least one electric motor arranged to drive the gearwheel 226 so as to drive the toothed rim 202 so that it acts via the threshold transmission device of the invention to drive the turnable sleeve 201, thereby turning the sliding rod 223 and thus steering the wheels it carries.

In order to separate the steerable bottom portion of the undercarriage from the steering actuators 230, it suffices to cause the prestress actuators 210 to release the spring washers 212 so that they no longer exert stress on the rings 204.

This separation may be used while towing so as to prevent the swiveling of the bottom portion of the undercarriage as imposed by the tractor from imparting any damage to the steering actuator 230. Damage may also occur if the steering actuator 230 attempts to steer in unwanted manner.

Under normal circumstances, the device of the invention enables torque to be transmitted from the steering actuator to the turnable sleeve, with the transmitted torque being limited to a value that may be adjusted by controlling the prestress actuators 210.

In the examples shown, the prestress exerted by the presser member is controlled by moving the seat against which the spring member bears in controlled manner relative to the transmitter member. Naturally other means exist for controlling variation in the prestress. For example, if the presser member is of a gas type, then it is possible to vary the pressure of the gas.

The term "presser member" is used to mean any member capable of generating stress when it is prestressed, and presenting a stroke that may be very short but that is sufficient to allow the second element to slide on the friction surface of the friction transmission member. By way of example, the term covers helical springs, spring washers, and also gas springs, or even hydraulic actuators, insofar as the oil held captive in the actuator is compressible to a small extent.

In addition, although the means for varying the prestress in this example are progressive so as to enable prestress to be established at a desired level, it is also possible to provide on/off variation means that serve to provide only two controlled positions, one of which corresponds to a determined level of prestress and the other of which corresponds to the prestress being fully released.

What is claimed is:

1. An aircraft undercarriage comprising:
   a strut that carries a steerable bottom portion carrying one or more wheels, and
   at least one steering actuator carried by the strut to steer the steerable bottom portion in a selective manner, the undercarriage having decoupling means enabling a selective decoupling of the actuator from the strut and selective force transmission means,
   wherein the decoupling means and the selective force transmission means are embodied in a single unit that comprises:
   a first element constrained in turning with the steerable bottom portion, and a second element constrained in turning with a portion of the undercarriage that is actuated by the steering actuator that is mounted to move relative to the first element,
   a friction member being arranged between the first element and the second element to exert a friction force between the two elements, which force presents a maximum value that depends on prestress established by a presser member, and
   remotely operable control means for varying the prestress imparted by the presser member to the friction member, which control means is operative to substantially release the prestress imparted by the presser member so that the prestress becomes substantially zero.

2. The undercarriage according to claim 1, wherein the presser member comprises a resilient prestress member the prestress varying means being arranged to modify the prestress of the resilient member.

3. The aircraft undercarriage according to claim 2, wherein the first element of the transmission device is constituted by a sleeve mounted to turn on the strut of the undercarriage, while the second element of the transmission device is a toothed rim that meshes with an outlet gearwheel of the steering actuator.

4. An aircraft undercarriage comprising:
   a strut that carries a steerable bottom portion carrying one or more wheels, and
   at least one steering actuator carried by the strut to steer the steerable bottom portion in a selective manner, the undercarriage having decoupling means enabling a selective decoupling of the actuator from the strut and selective force transmission means,
   wherein the decoupling means and the selective force transmission means are embodied in a single unit that comprises:
   a first element constrained in turning with the steerable bottom portion, and a second element constrained in turning with a portion of the undercarriage that is actuated by the steering actuator that is mounted to move relative to the first element,
   a friction member being arranged between the first element and the second element to exert a friction force between the two elements, which force presents a maximum value that depends on prestress established by a presser member, and
   remotely operable on/off variation means of the prestress imparted by the presser member to the friction member that provides only two controlled positions, one of which corresponds to a determined level of prestress and the other of which corresponds to the prestress being fully released member so that the prestress becomes substantially zero.

* * * * *